(12) United States Patent
Ward (10) Patent No.: US 9,152,945 B2
(45) Date of Patent: Oct. 6, 2015

(54) SYSTEMS AND METHODS FOR AUTOMATED RENTAL MANAGEMENT

(76) Inventor: Sean Ward, El Dorado Hills, CA (US)

( * ) Notice: Subject to any disclaimer, the term of this patent is extended or adjusted under 35 U.S.C. 154(b) by 473 days.

(21) Appl. No.: 12/804,212

(22) Filed: Jul. 16, 2010

(65) Prior Publication Data

US 2011/0015954 A1    Jan. 20, 2011

Related U.S. Application Data

(60) Provisional application No. 61/271,071, filed on Jul. 16, 2009.

(51) Int. Cl.
*G06Q 10/00* (2012.01)
*G06Q 10/10* (2012.01)
*G06Q 10/02* (2012.01)
*G06Q 30/06* (2012.01)
*G06Q 50/16* (2012.01)

(52) U.S. Cl.
CPC ............ *G06Q 10/10* (2013.01); *G06Q 10/02* (2013.01); *G06Q 30/06* (2013.01); *G06Q 50/16* (2013.01)

(58) Field of Classification Search
CPC .............................. G06Q 10/10; G06Q 10/02
USPC ............................................................. 705/5
See application file for complete search history.

(56) References Cited

U.S. PATENT DOCUMENTS

| | | | |
|---|---|---|---|
| 6,671,697 B1* | 12/2003 | Thibodeau | 705/26.1 |
| 2002/0065688 A1* | 5/2002 | Charlton et al. | 705/5 |
| 2003/0097274 A1* | 5/2003 | Parsons | 705/1 |
| 2007/0156429 A1* | 7/2007 | Godar | 705/1 |

* cited by examiner

*Primary Examiner* — Allen J Jung (57) ABSTRACT

Systems and methods for automated vacation rental management via a website configured to allow property owners to be able to list their home or unit and information about the home or unit on the site for users to view and book rentals. The system allows the home or unit owners to be able to administer their own pages that are listing their homes, e.g. by editing their profile, rates, etc. Users are able to search by location and book times to stay at the vacation home, without interaction with the owner. The system enables automated management of the vacation property, via online payment of deposits and rental fees, automated updating of booking calendars, and automated communication between renters, cleaners, owners and any other entities associated with the process.

15 Claims, 10 Drawing Sheets

102
LOCATION
Address
Country
State
City
Zip
} 112

104
ACCOMMODATIONS
Bedrooms:  Sleeps
Baths:
Beds: King  Queen
Full  Twin
Bunk  Sofa
} 114

106
PROPERTY DESCRIPTORS
Title
Description
} 116

108
PROFILE INFORMATION
Name  Account #
Address  Credit Card#
Country  Expiration  Pin
State  Phone
City  Cell
Zip  Email
} 118

| AMENITIES | |
|---|---|
| ☐ | Cable/Satellite TV |
| ☐ | Game Boxes |
| ☐ | DVD Player |
| ☐ | VCR Player |
| ☐ | Stereo/IPOD |
| ☐ | DVD Video Library |
| ☐ | Indoor Hot Tub |
| ☐ | Outdoor Hot Tub |
| ☐ | Private Hot Tub |
| ☐ | Private Pool |
| ☐ | Public Pool |
| ☐ | Sauna/Steam Room |
| ☐ | Pool Table |
| ☐ | Foosball |
| ☐ | Card Table |
| ☐ | Pin Pong |
| ☐ | Air Hockey |

124 points to the DVD Player checkbox; 122 brackets the list of amenities.

ADD PHOTO

Add Photo 1 [        ] Browse   Image Preview
Add Photo 2 [        ] Browse   Image Preview
Add Photo 3 [        ] Browse   Image Preview
Add Photo 4 [        ] Browse   Image Preview 128 brackets the image previews.

( upload )

SYSTEMS AND METHODS FOR AUTOMATED RENTAL MANAGEMENT

CROSS-REFERENCE TO RELATED APPLICATIONS

This application claims priority from U.S. provisional application Ser. No. 61/271,071, filed on Jul. 16, 2009 and herein incorporated by reference in its entirety.

BACKGROUND OF THE INVENTION

1. Field of the Invention

The present invention relates generally to systems and methods for automatic management of vacation rental properties. More particularly, the invention is directed to systems and methods for providing a website that automates the rental process for property owners and prospective renters.

2. Description of the Background Art

Web-based vacation rental services provide a convenient platform for vacation/home owners to list their properties. However, these sites, e.g. vrbo.com or the like, typically require owners to manually handle transactions with renters and potential renters. For example, a typical transaction requires a potential renter to contact the owner via contact information available on the website, send/charge some form of payment with the owner, wherein the owner then manually updates the availability calendar on the website. This above process is cumbersome and time consuming for both the renter, who often must verify that the calendar is up to date because the process often leads to inaccurate availability listings, and the owner, who is subjected to numerous correspondence and phone calls from inquiries that may or may not be legitimate or serious.

In addition, while users can search for properties fitting within certain criteria, e.g. rental rate, current rental services do not correlate this information with respect to calendar dates. Because rental rates are often a function of timing (e.g. season, holidays, weekends, etc.), user searches often pull up properties that may be out of the user's price range for a desired period of time.

Accordingly, an object of the present invention is to provide a web-based platform that automates the rental process between property owners and prospective renters to streamline the listing and rental process. Another object is a rental web interface that allows users to search attributes regarding properties with respect to a given date range. At least some of these objectives will be met in the following description

BRIEF SUMMARY OF THE INVENTION

The present invention includes systems and methods for automated vacation rental management via a website configured to allow people who own a vacation home, condo, hotel or other property to be able to list their home or unit and information about the home or unit on the site for users to view and book a time to stay that is available. The system allows the home or unit owners to be able to administer their own pages that are listing their homes, e.g. by editing their profile, rates, etc. The system allows users to search for vacation homes that are within the database placed on the site by the home owners. Users are able to search by location and book times to stay at the vacation home, without interaction with the owner. The system enables automated management of the vacation property, via online payment of deposits and rental fees, automated updating of booking calendars, and automated communication between renters, cleaners, owners and any other entities associated with the process.

The present invention provides an automated management website configured to enable private and small business owners of homes, condos, and multi-unit properties to book to book their properties on-line. The system includes a private web page for each specific owner, and automated payment with sites such as Paypal, Authorize.net, etc. that triggers, upon approval, automated e-mail, texting or other notification to entities specified by the owner, such as the owner's email address, management, maid service. Thus an auto confirmation of the transaction is sent to the owner to streamline time for owners. The system allows for automated choice of time related pricing and length of stay minimums per choice of each individual manager or owner of the property. The system includes a website page that has a description of property with the pictures and automated bill pay and calendar that is also automated and linked to bookings, wherein the webpage streamlines the process for the renter and owner and makes transaction automated to save time.

An aspect of the present invention is a system for automatic updating of a rental property listing, comprising: a server comprising a database configured to store one or more data fields relating to the property listing; software executable on said server for carrying out the steps of: providing a graphical user interface for the property listing, the graphical user interface containing data populated from one or more data fields in said database; wherein the graphical user interface comprises a calendar represented by a plurality of visual entities, each of said visual entities corresponding to a date on said calendar; automatically receiving notification regarding a payment received for booking a rental date with respect to at least one of said visual entities; and automatically updating a characteristic of said visual entity based on said notification; wherein said characteristic indicates that the property listing is unavailable for future booking on a date related to said visual entity.

In one embodiment of the current aspect, the system further comprises: providing a plurality of graphical user interfaces relating to individual property listings, each property listing being owned by distinct separate owners; wherein each of said graphical user interfaces comprises said calendar; said calendar relating individually to each individual listing; wherein the server is coupled to a network such that a plurality of users may view said property listings; and wherein a user may select one or more of said visual entities for booking one or more dates associated with a selected property listing; securing payment from said user with respect to said one or more dates; receiving notification with respect to confirmation of said payment; correlating said notification to the selected property listing; and automatically updating a characteristic of said visual entity of the selected property listing; wherein said characteristic indicates that the selected property listing is unavailable for future In another embodiment, securing payment from said user comprises: sending payment data to a payment gateway; requesting approval for said payment data; and wherein receiving notification comprises receiving a notification of confirmation of said payment from said payment gateway.

In another embodiment, the method further comprises: providing fields for an owner to upload data relating to said property listing; and correlating said uploaded data to said one or more visual entities.

In another embodiment, the method further comprises: wherein said data comprises a rental rate associated with said listing.

In another embodiment, the method further comprises: wherein said data is visually represented on at least one of said plurality of visual entities.

In another embodiment, the data comprises one or more of said description of property, pictures, and contact data to website.

In another embodiment, the method further comprises automatically sending an email to one or more recipients based on said notification.

In another embodiment, the method further comprises automatically sending an email to user based on said notification; said email comprising a lease agreement related to said listing.

Another aspect is a method for automatic updating of a rental property listing, comprising: executing software on a server comprising a database configured to store one or more data fields relating to the property listing; wherein executing the software comprises carrying out the steps of: providing a graphical user interface for the property listing, the graphical user interface containing data populated from one or more data fields in said database; wherein the graphical user interface comprises a calendar represented by a plurality of visual entities, each of said visual entities corresponding to a date on said calendar; automatically receiving notification regarding a payment received for booking a rental date with respect to at least one of said visual entities; and automatically updating a characteristic of said visual entity based on said notification; wherein said characteristic indicates that the property listing is unavailable for future booking on a date related to said visual entity.

Another aspect is a system for automated management of a rental property listing, comprising: a server comprising a database configured to store one or more data fields relating to the property listing; software executable on said server for carrying out the steps of: providing a graphical user interface for the property listing, the graphical user interface containing data populated from one or more data fields in said database; wherein the graphical user interface comprises a calendar represented by a plurality of visual entities, each of said visual entities corresponding to a date on said calendar; providing fields for an owner to upload data relating to said property listing; correlating said uploaded data to said one or more visual entities; wherein said data comprises a rental rate associated with said date of said listing; and searching said database with respect to said rental rate and said date.

Further aspects of the invention will be brought out in the following portions of the specification, wherein the detailed description is for the purpose of fully disclosing preferred embodiments of the invention without placing limitations thereon.

DETAILED DESCRIPTION OF THE INVENTION

In the following description, various aspects of the invention will be described. For purposes of explanation, specific configurations and details are set forth in order to provide a thorough understanding of the present invention. However, it will also be apparent to one skilled in the art that the present invention may be practiced without the specific details herein. Furthermore, well known features may be omitted or simplified in order not to obscure the present invention.

Figure 1:
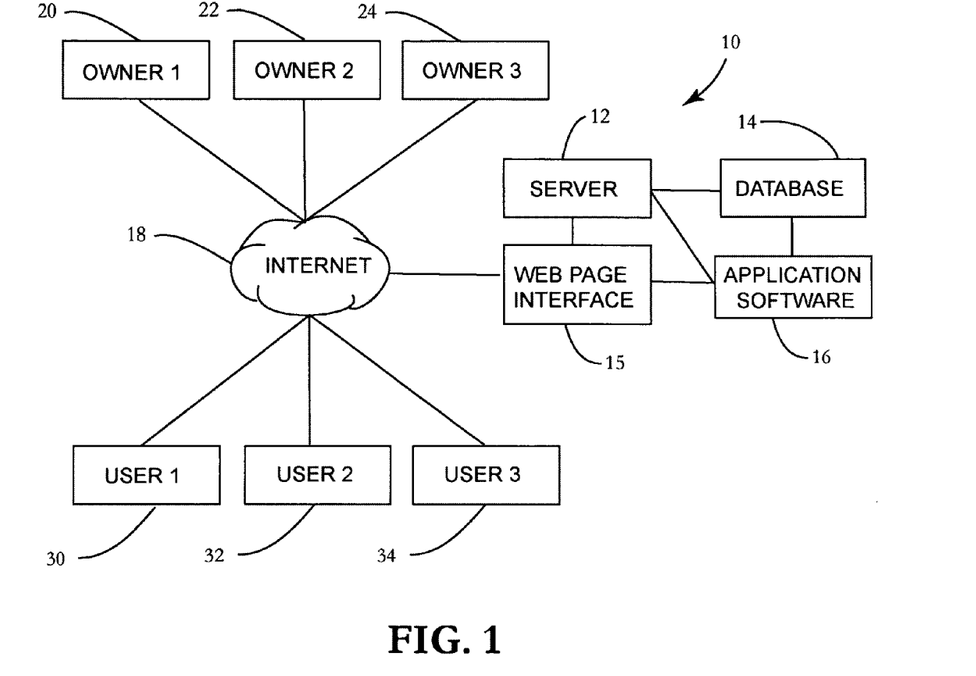
FIG. 1 is a schematic view of a system for automated listing and rental of property in accordance with the present invention.

FIG. 1 illustrates is a schematic view of a system 10 for automated listing and rental of property in accordance with the present invention. The system 10 provides a web page interface 15 for linking over the Internet 18 any number of a plurality of owners 20, 22, 24 with a number of users 30, 32, 23 that are looking for or interested in renting a property for a period of time. The owners 20, 22, 24 have one or more properties that they are listing for rental. Central server 12 comprises application software 16 that collects and gathers data relating to the listed properties in database 14, and lists the properties in individual web pages at interface 15 that are individually viewable and searchable by users 30, 32, and 34.

Figure 2:
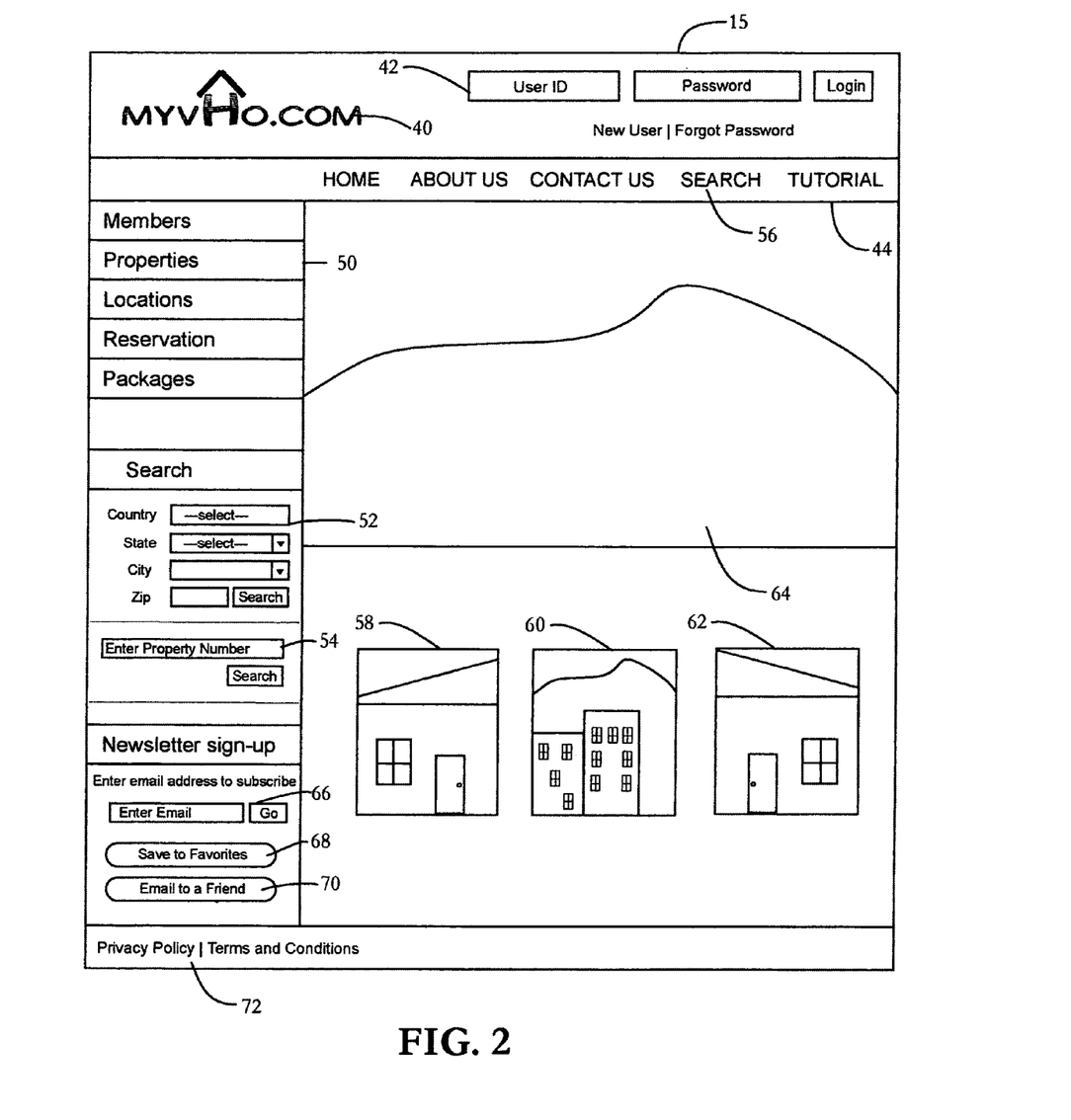
FIG. 2 is a screen view of an exemplary front web page of the user interface of the present invention.
Figure 3:
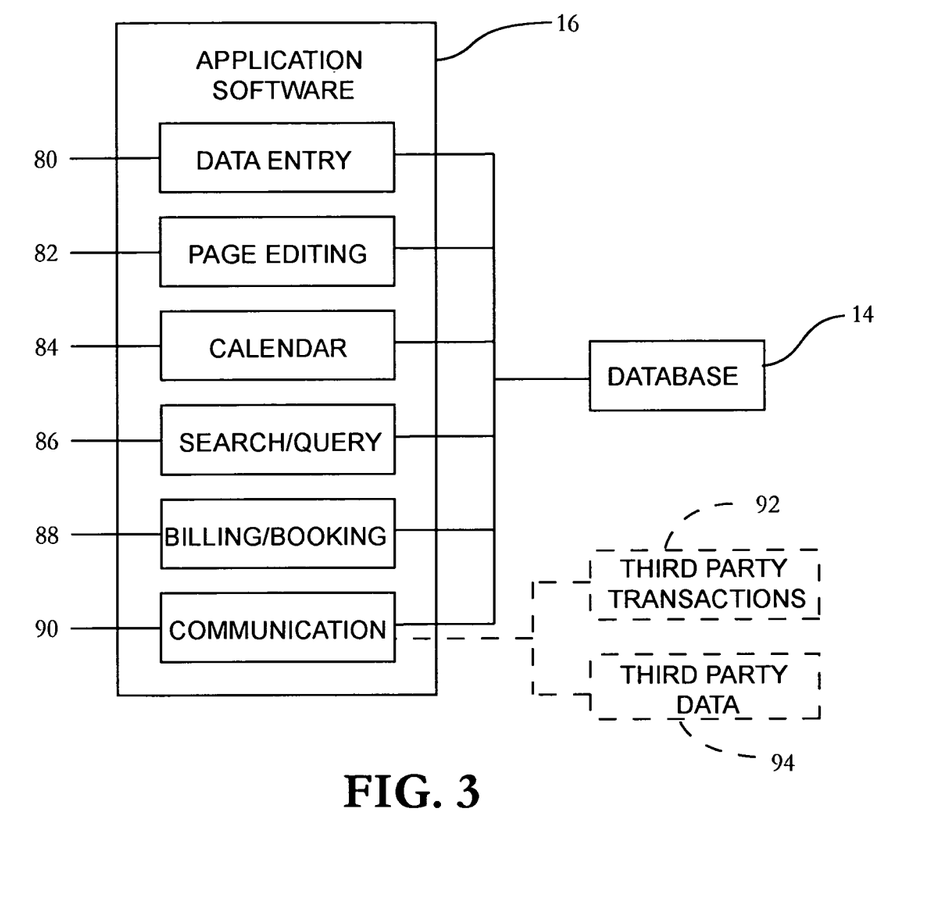
FIG. 3 is a schematic view of the application software for performing automated property management in accordance with the present invention.

FIG. 2 illustrates an exemplary front page 15 for an automated vacation rental in accordance with the present invention. When the logo 40 is clicked from any page it will take the user to the home page as shown in FIG. 3. The page may comprise a user login 42, which allows a returning member to log in to the site and once their ID and password is submitted, take them to the member page. Property owner's 20, 22, 24 may have a specific page that allows them to update their listings or perform other actions on the site. General users 30 looking to rent may also register, such that the system 10 saves their contact, billing, address and other data that may be automatically populated for subsequent rentals. To submit the ID and password the member can either hit the enter button or click the login button. If a user is not a member they will be able to click the "new user" registration button to be brought to the registration form that replaces the middle area of the home page. The user can also click the register button to be taken to a registration page that will prompt them to fill out a form. The user will also be able to check a box that will signify if they would like us to retain their credit card information for future use or to not save the information if they so wish.

The page 15 may comprise categories in top menu bar 44 that direct the user to various functions provided by the site. A left side menu bar 50 may also comprise a series of link that forward the user to certain aspects of the site. For example, to start browsing listings, a user 30 may simply hit the "properties" button.

The left menu bar 50 may also include a series of search fields 52 that allow a user initiate a search by geographic area, or by the property number in field 54 if they know it. The user may also perform an advanced search, e.g. via menu option 56, to search via other criteria (e.g. rate, date/availability, amenities, etc.)

The top menu bar 44 may also have a series of static functions, e.g. "home" tab, which is a link that directs the user back to the home page when clicked. The site is configured such that an administrator is able to edit the content of the static pages by using a WYSIWYG tool or editor. The "About Us" tab is generally a static page edited by the administrator for details about the site. The "Contact Us" tab is a static page that that may also be edited by the administrator. A "Tutorial" tab may also be included, which is a static page that provides instruction for owners or users. Additional features include a "Privacy Policy" link and "Terms and Conditions" link 72, both static pages that may be edited by the administrator.

A rotating image 64 may be available to fade in/fade or otherwise rotate out a plurality of images. The administrator will have the ability to add and remove images. Text may also be provided in this are notifying users of general or special announcements. The page 15 may also include a number of thumbnails 58, 60, 62, that direct the user to larger photos or pages associated with a particular property of interest, and which may be uploaded and edited by the administrator via site functionality. Images of "sponsored properties," e.g. owners who pay special fee for extra exposure, may be programmed to pop up based on a variety of criteria, e.g. user's prior history or geographical search request, etc.

A "Newsletter Signup" field 66 may also be included, and this function would allow the user to put in their email address and submit that to the database. The administrator may then be able to export the subscriber list through the administration area and view in a CSV (comma separator/spreadsheet) file.

A "Save to favorites" button 68 may be included to bring the user to their browser's "add to favorite" function where they will be able to save links to desired properties of interest.

The page may also include an "Email to a friend" button 70. When this is clicked, a pop-up window is launched that will prompt the user to enter their name and email and the name/email of another friend/user, and edit text for the message. This function will also be on the product level as well as the home page, so that it will send them the web address of the page that they are on.

Figure 12:
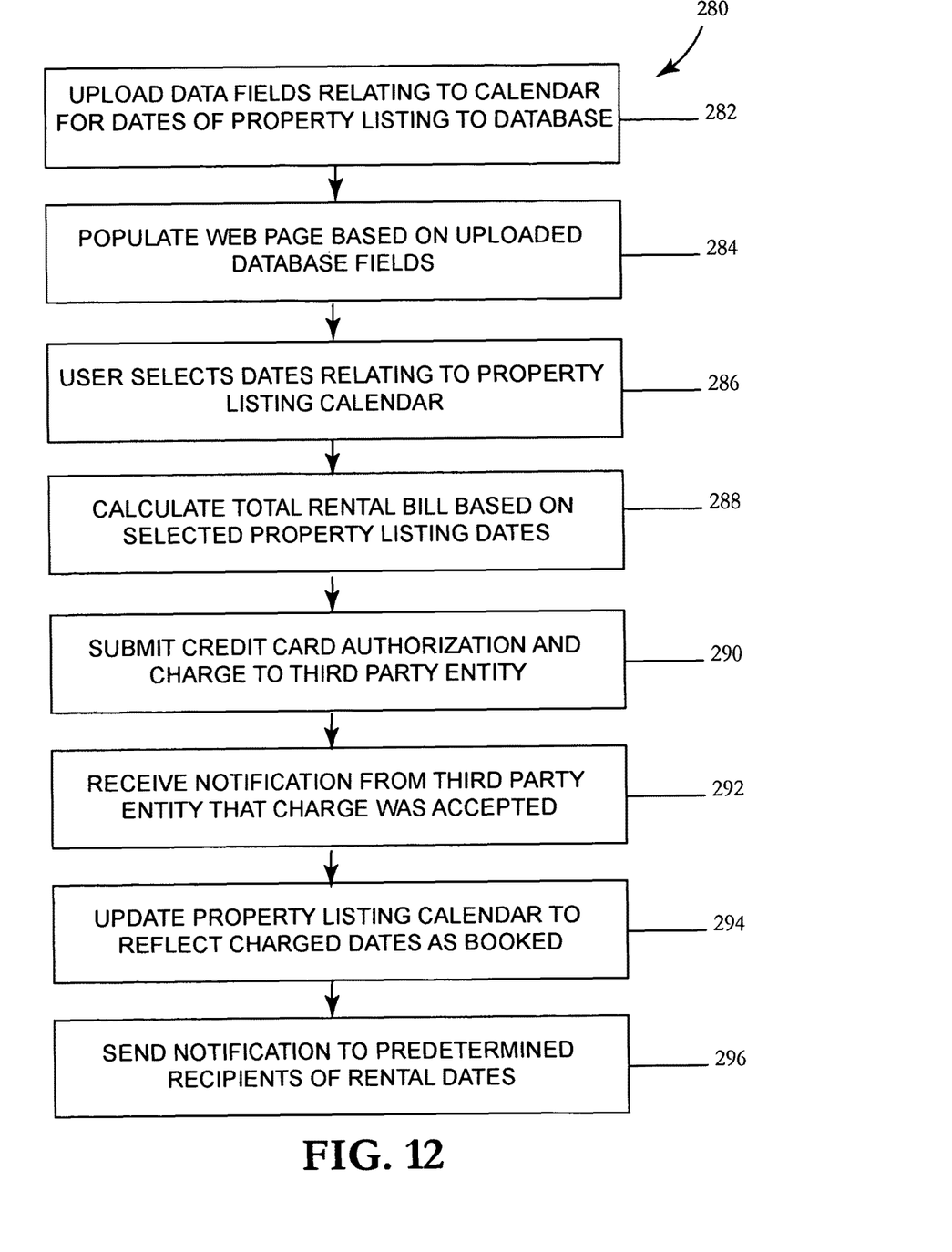
FIG. 12 is a flow diagram of a method for performing automated property management in accordance with the present invention.

FIG. 3 shows a schematic view of application software 16 in accordance with the present invention. The software is configured to perform a method 280 of managing a web-based rental property as shown in FIG. 12. The application software comprises, to a plurality of modules that all interface with database 16 over server 12. For example, a data entry module 80 is provided for allowing a property owner 20 to enter information relating to the property being listed (e.g. text describing rooms, amenities, rates etc. and photos of the property) and user profile information (e.g. contact info, billing info, etc.).

Figure 4:
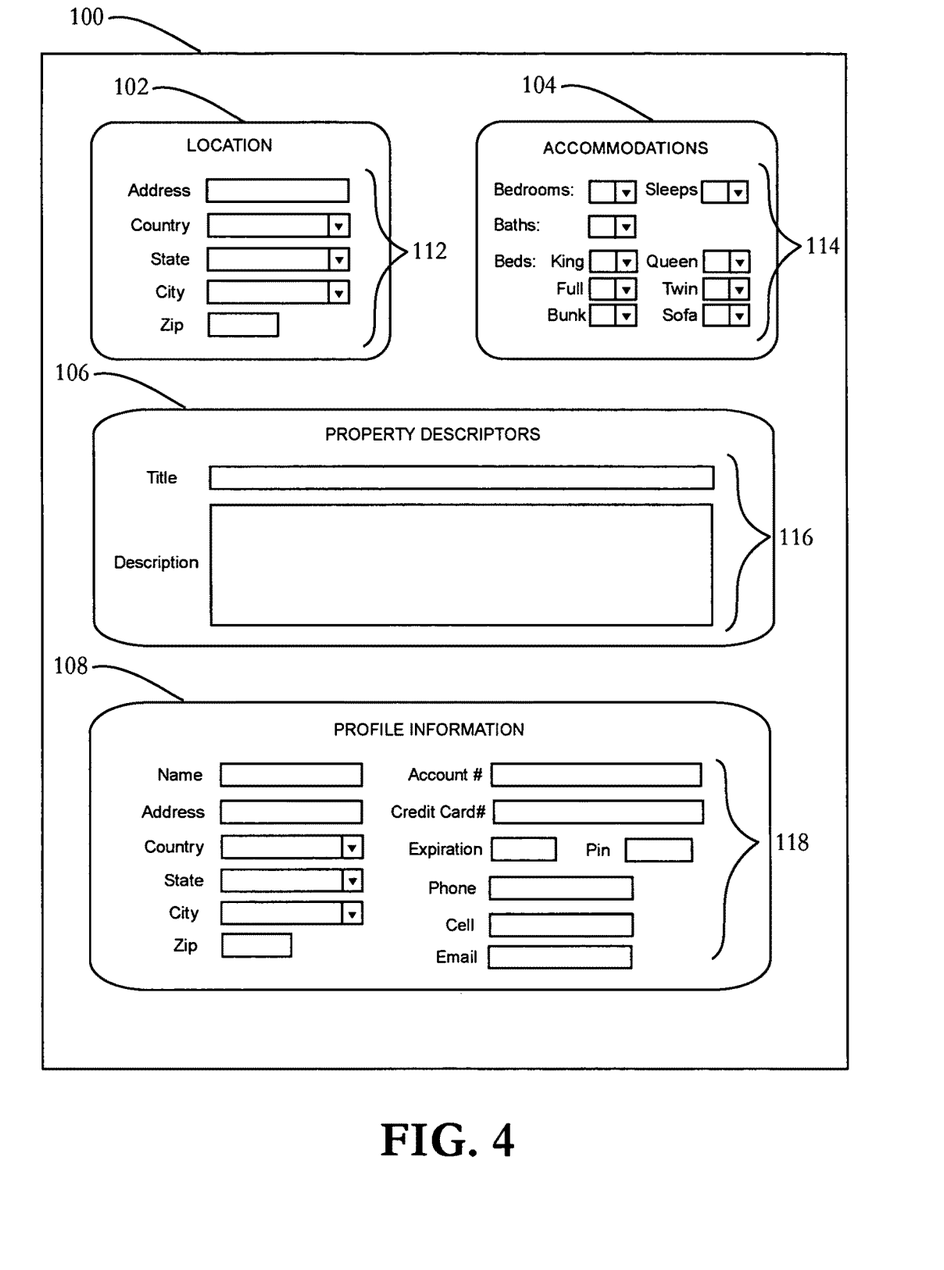
FIG. 4 is a screen view of a property listing building/editing module in accordance with the present invention.

As shown in FIG. 4, the data entry module 80 may comprise a plurality of data entry fields 112, 114, 116, and 118 that are disposed within one or more screens 100 to aid the owner 20 in providing the property descriptors and also assigning field ID tags to the data for retrieval and page building/editing. This step is illustrated as uploading step 282 in the method 280 of FIG. 12. Screen 100 would typically only be available after private login from the owner to the property listing page. For example, the owner 20 would fill in fields 112 of location box 102 to establish the location of the property. The owner 20 may also enter fields 114 detailing the number of bedrooms, baths, and number and type of beds in the accommodations box 104. The owner 20 may further provide a title and description of the property in fields 116 of property descriptors box 106. In addition, the owner 20 would fill in the personal information data fields 118 of profile information box 118 that are specific to the owner. The data fields in profile box 118 get stored on database 14, but are generally not visible or retrievable to the public. The personal information data fields 118 may include the owner's address, banking account number for receiving rental funds, credit card info for fees paid to site, and phone/email/contact info so that alerts, notifications of rental, questions from users, etc. may be directed to the owner.

The data entry screen 100 shown in FIG. 4, is illustrated for exemplary purposes only, and may include additional entry fields or may be one of a number of screens that allow the owner to sculpt their site listing to look and have functionality tailored to their preferences. For example, the property owner 20 may be directed to add contact/communication information (e.g. email, cell phone number, etc.) for automatic e-mail email generation (or text generation via SMS etc.) upon booking. Contact information may be provided for client (property owner itself), property manager, house keeping, etc. For example, one can add an email address so that an automated notification is sent to the cleaners of the property to notify them when the property is booked and needs to be cleaned. Correspondingly, each email address provided will receive an email detailing when a property has been booked and the arrival and departure dates for each booking.

Figure 5:
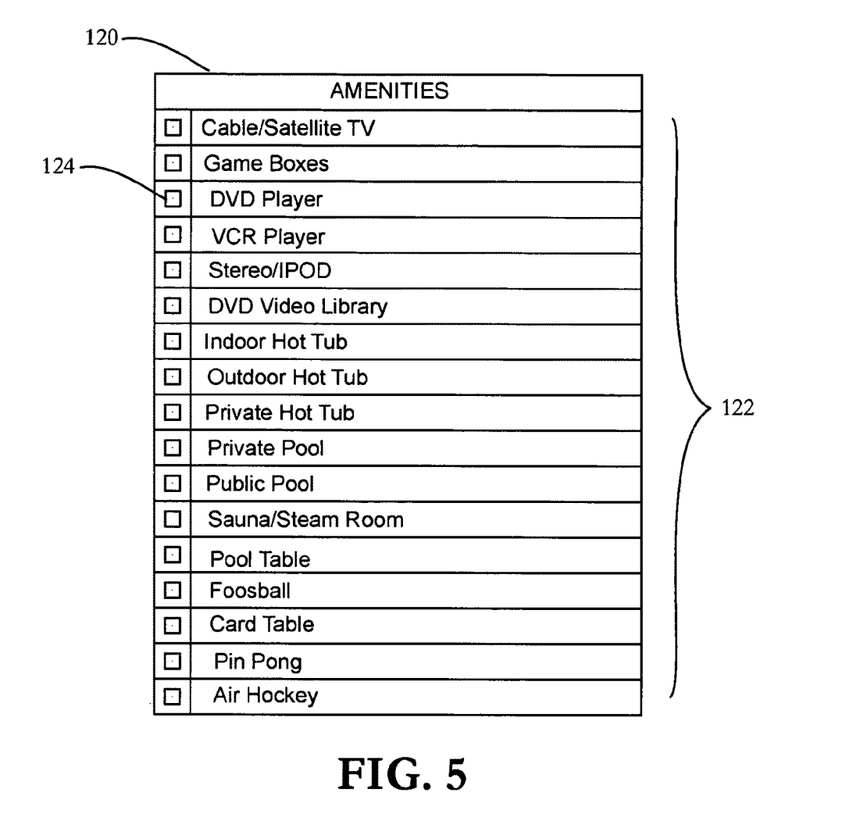
FIG. 5 is a screen view of a property listing building/editing module for amenities in accordance with the present invention.

As shown in FIG. 5, amenities can be entered in via a series of check-box fields 122 in amenities box 120. Check boxes 124 are provided for each of the amenities that are already stored in a database. The property owner may then choose a check box next to each amenity that corresponds to their property. An extra form (not shown) may also be available for amenities not found in the database.

Figure 6:
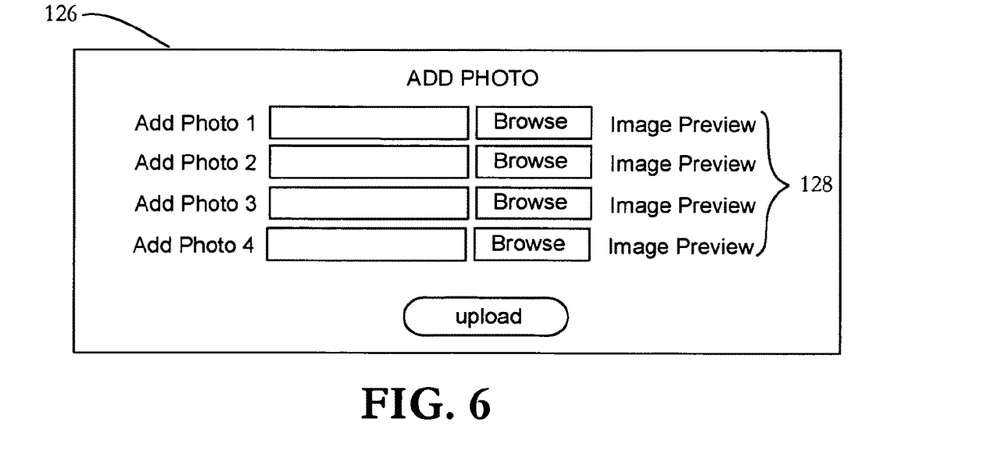
FIG. 6 is a screen view of a photo uploader for a building/editing module in accordance with the present invention.

The system further provides a photo upload box 126 that enables the owner to upload one or more photos (along with photo descriptions) via fields 128. A picture may be chosen for selection as the large (primary) picture at top. Each property page 200 will have the images shown as uploaded by the owner, and all pictures may have an option to add a short description with the image.

Figure 7:
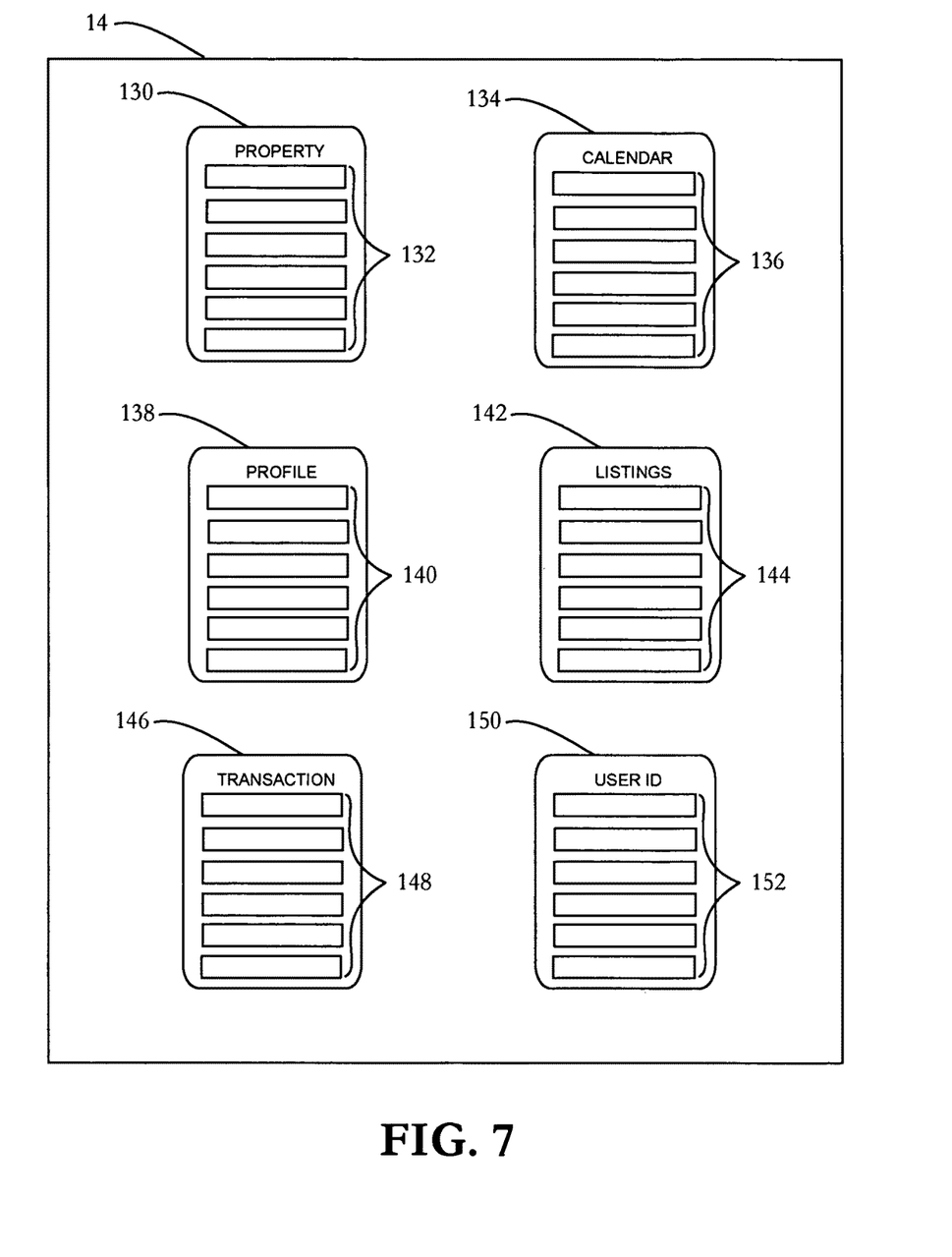
FIG. 7 is a schematic view of database for performing automated property management in accordance with the present invention.

FIG. 7 illustrates exemplary relational tables of data fields stored in database 14. Each of the fields entered via data entry module 80 has a corresponding ID that assists in categorizing data for search and retrieval. All items are preferably stored within a singular database 14, but generally will span several tables within said database 14. The property listing table 142 holds the 'root level' data fields 144, such as each property ID, and corresponding property owner, etc. That property ID is then utilized throughout the other tables in the database to link back to the property in question. The system 10 auto-assigns a property ID number that is used for each unique property URL. The database may also include a plurality of property tables 130 that contain the uploaded fields 132 for each website or property ID. Continuity tables may also be provided that cross reference two tables.

A calendar table 136 may be provided detailing fields 136 of available dates and values, e.g. rates, minimum booking periods, color coding etc. The database 14 may also contain a transaction table 146 detailing data fields 148 relating to all transactions between users and owners. In addition, a user ID table 150 may be included in the database 14 having fields 152 associated with registered and/or transacting users within the system 10.

Figure 9:
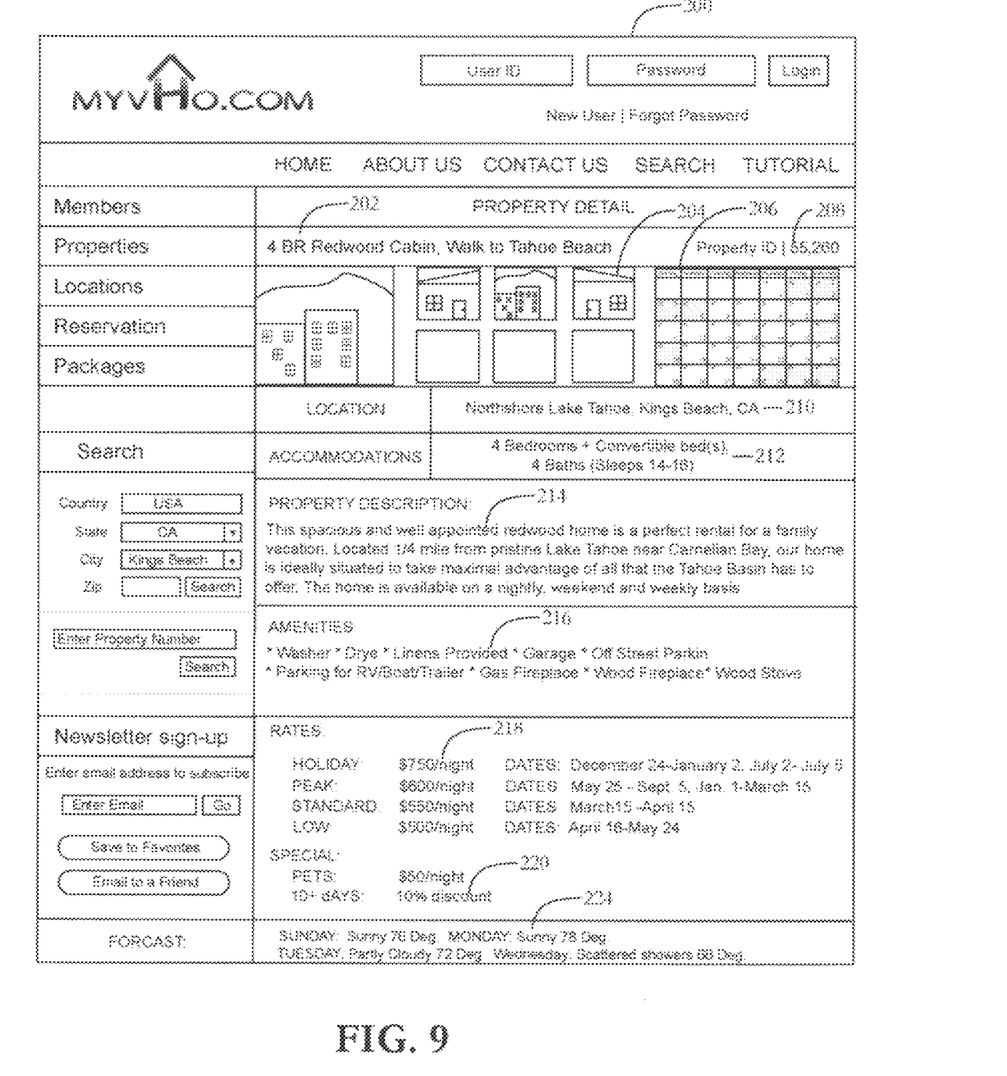
FIG. 9 is a screen view of a populated property listing page in accordance with the present invention.

Referring back to FIG. 3, page editing module 82 takes the data entered from data entry module 80 and automatically populates and builds a unique web page for each property, as illustrated in populating step 284 shown in method 280 FIG. 12. An exemplary page 200 is illustrated in FIG. 9, described in more detail below. Certain assigned fields in the database 14 are automatically populated onto the URL webpage, while other fields, e.g. owner's personal information, e.g. home, billing address, email address, phone number, billing info, etc., remain in the database 14 hidden from the public to maintain user privacy.

The application 16 further comprises an interactive calendar module 84 that allows the owners 20 to assign attributes (e.g. rates, minimum booking days, etc.) to individual calendar dates, and allows users 30 to select dates on the output property calendar for searching, automated booking and updating. It is appreciated that the calendar module 84 may be integrated with data entry 80 and page editing 82 modules, and at the very least is interactive with other modules, e.g. data entry 80, page editing 82, and search query 86.

Much like the data entry page 100, the property owner 20, when building or updating their listing, may then be directed to a set of fields for entering calendar-based pricing, e.g. management of low, medium, and high season pricing schemes, as well as minimum booking days and other details of importance to the property owner. The website may have preset variable pricing schemes, e.g. Low, Med, High, Holiday, etc. season pricing that may also be limited to minimum stay periods. For example, if summer time is a one week minimum stay do to high traffic at this period owner can pick this drop down for a one month or multi-month period. The owner 20 may also pick numerous price ranges that can be put into weekly or monthly periods that can begin and end for seasonal pricing. The system 10 may also include blocking out a period of time that the property is being used by the owner for personal or property management purposes.

Figure 8:
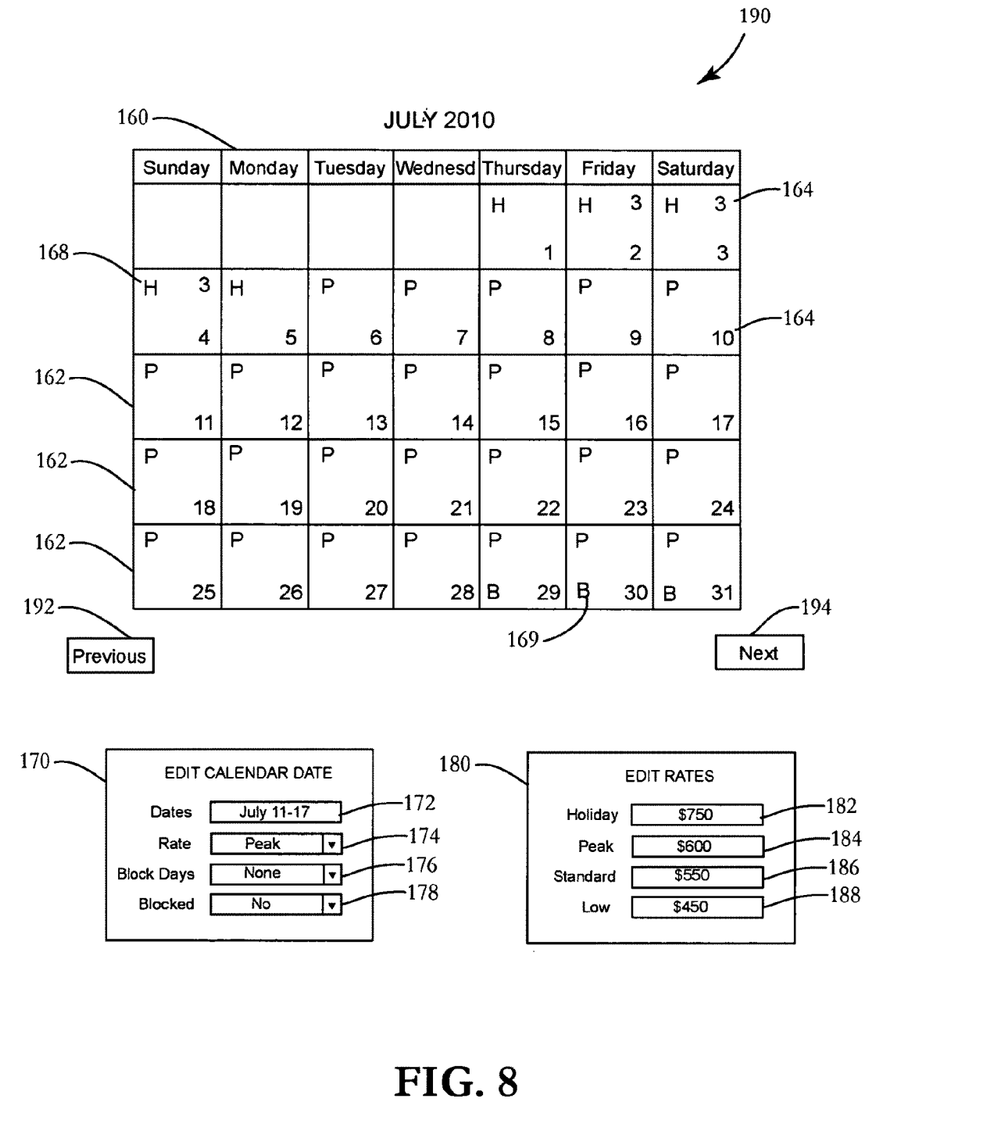
FIG. 8 is a screen view of a calendar building/editing module in accordance with the present invention.

In a preferred embodiment detailed in FIG. 8, a visual calendar building/editing system 190 may be provided, which includes an interactive property calendar 160 comprising individual, selectable and editable blocks 162 for each day in a given calendar period. The month of July 2010 is chosen as the calendar period for illustrative purposes, however, weekly or yearly periods may also be chosen. To scroll through months, the owner may select the "previous" button 192 to see June, or the "next" button 194 to see August. Each property will show an 'Availability' calendar (e.g. calendar 208 in FIG. 9). This calendar is configurable by the property owner 20 as the interactive property calendar 160, allowing the owner 20 to allocate which dates the property is or is not available, rates for holiday, high, medium and low periods, minimum booking, etc.

As shown in FIG. 8, the blocks 162 are aligned in rows corresponding to the day of the week (Sunday, Monday, Tuesday, etc.). Individual blocks 162 can be linked to each other in a number of ways. As shown in FIG. 8, the calendar 160 may be configured with quadrants pertaining to data relating to each date block 162. The lower right quadrant 164 represents the actual calendar date, and is automatically populated via the application software 16. The upper right quadrant 166 represents minimum booking periods. The owner may enter any number in this quadrant to specify how many consecutive dates are required for rental on a period containing that block 162. As shown in FIG. 8, the dates of July 2-4 have a "3" in quadrant 166. This illustrates that the owner is requiring a minimum of a three night rental for any rental period falling on the days of July 2-4. If a user 30 attempts to merely rent for Friday and Saturday night (two night rental For July $2^{nd}$ and $3^{rd}$), the system 10 will halt booking, and display a message that a three-night minimum is required for booking those dates. The user must then select July 1 of July 4 to move forward with booking.

The upper left quadrant 168 represents the rate associated with that block. As shown in FIG. 8, the dates of July 1 through July 5 are assigned an "H" for "holiday" rate, with the remaining dates in the month assigned a "P" for "peak" rate. If a user 30 selects the dates July $3^{rd}$ through $7^{th}$ for booking, the application 16 will automatically compute two days at the "holiday" rate and two days at the "peak" rate for the total billing charge.

The lower left quadrant 169 represents blocked dates by the owner. As shown in FIG. 8, the dates of July 29 through July 31 are assigned a "B" in quadrant 169, indicating that those dates are blocked by the owner 20. A user 30 trying to select only one of the blocked dates will be rejected by the system.

Editing the calendar 160 may be performed simply by selecting one or more blocks 162. Blocks 162 may be selected via typical mouse-keyboard functionality (e.g. Shift-click, Crtl-click, or dragging cursor over a range of dates while holding the left click mouse button). When the user 30 selects a date block 162, or range of date blocks (as shown in FIG. 8 for the period of July 11 through 17, and as illustrated in selecting step 286 shown in method 280 of FIG. 12.), the system shades the blocks (e.g. blue), and pulls the date range up in the editing box 170 (showing July 11 through 17 in field 172, which also may be entered via keyboard). The user may then select a drop down for the rate at field 174, minimum booking days in field 176, and whether the date is blocked in field 178. After selecting these fields, the blocks 162 are updated in the calendar, and the calendar table 134 in database 14 is updated to reflect the values selected for the given dates.

The owner 20 may also edit the rates associated with each rate period. For example, rate editing block 180 may be provided such that the owner can type in a value in fields 182, 184, 186, and 188 for "Holiday," "Peak," "Standard," and "Low" periods respectively. The number and naming of periods may also be edited by the owner 20.

In addition to the above values, other attributes may also be assigned to calendar date blocks 162. For example, the owner may specify that in intermediary "approval" step is required before any money is exchanged or dates booked. In this scenario, the owner could block a set of dates, or all dates, so that a user selecting a given date range and getting pre authorized for credit card is placed on a "hold" while the system sends an email or text to the owner notifying them of the pending transaction. The owner can then reply to the message, via a "yes"-"no," designated pass code, or the like to approve the transaction to continue through the booking and billing process.

In addition, the owner 20 may specify a partial/total amount required for reservation of particular dates. For example, "peak" season rentals may require full amount charged to reserve dates, and "low" season may only require half-down, or other deposit amount, to reserve. The balance may set to be automatically billed (e.g. via on-line credit card transaction) at thirty days prior to (or other designated time) the arrival date of the renter.

It is also appreciated that the above quadrant scheme is one of many ways of illustrating/editing block dates 162. For example, color/pattern shading with corresponding legends may be used to show different rate periods, or different attributes assigned to the block 162.

FIG. 9 shows a view of a property listing web page 200 that is populated from data entered into the database 14. Certain assigned fields from database 14 are automatically populated via the page editing module 82 onto the URL webpage, while other fields (e.g. owner's personal information, e.g. home, billing address, email address, phone number, billing info, etc.) do not get populated.

As shown in FIG. 9, the web page 100 is populated by the page editing module 82 based on the field ID's with title 202, property ID 208, the uploaded pictures 204, location 210, accommodations 212, property description 214, and amenities 216. The availability calendar 206 is also provided in thumbnail view (clickable for larger view), and illustrates the attributes that have been entered by the owner, and shows shaded regions (e.g. red background with white text as opposed to white background with black text for open dates) that indicate blocked, booked or otherwise unavailable dates.

The page editing module 82 also automatically populates a synopsis of rates 218 based on the attributes assigned to dynamic calendar 160 and reflected in availability calendar 208 of page 200. Special rates 220 may also be updated.

The page 200 may also be configured to populate other data, such as the forecast 222 for the location of the property. This data may be provided by a third party source, wherein a module of the application software 16 automatically updates a table in database 14 based on a link to data from a third party source 94 (see FIG. 3), e.g. National Oceanic and Atmospheric Administration (NOAA), weather.com, or the like. This third party data may be linked to the calendar dates, to provide other functionality such as forecast or almanac-based property searching of properties.

Figure 10:
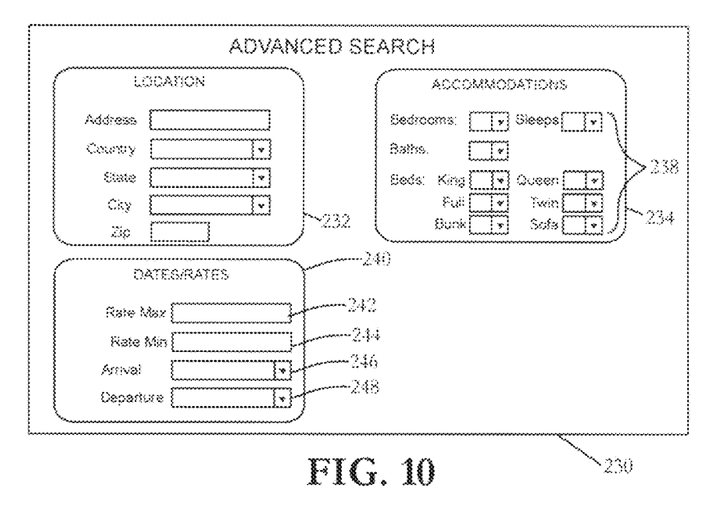
FIG. 10 is a screen view of an advanced search module in accordance with the present invention.

Referring back to FIG. 3, a search query module 86 is provided which allows a user 30 to browse through a list of available properties based on criteria of interest to them. The search bar 52 in FIG. 2 provides a "quick-search" utility from any page on the site. Additionally, an "advanced search" box 230 may be used as illustrated in FIG. 10. Properties will be listed by area, and can also be searched for via location searching (box 232), rates (min/max rate fields 242, 244 in box 240), dates/availability (arrival/departure date fields 246, 248 in box 240), and a number of keyword criteria relating to the property descriptors provided by the listing owners.

For example, the user 30 may enter a number in any of the fields 238 of the accommodations box (e.g. sleeps at least 10), along with a max rate of $500 per night in field 242 for a specified upcoming weekend in fields 246 and 248 and a given location in box 232 to find a property that meets all the above criteria. Because rate information is tied to actual date blocks in a searchable form, only dates meeting the threshold rental rate for the specified period will be returned.

It is appreciated that any number of criteria may be provided in the search (e.g. ski-in-ski-out, lakefront, lake view, oceanfront, outdoor hot-tub, etc.) may be included as search field entries. In addition, the dates may be correlated to third party data from third party source 94 to query for properties meeting a particular forecast or almanac (e.g. sunny, 80deg min for a beach destination, or show forecast for a skiing destination).

Referring back to FIG. 3, the application 16 includes a billing/booking module 88 that integrates with the calendar module 84 and communication module 90 to affect a transaction between an owner 20 and user 30 via a third party transaction service 92.

Figure 11:
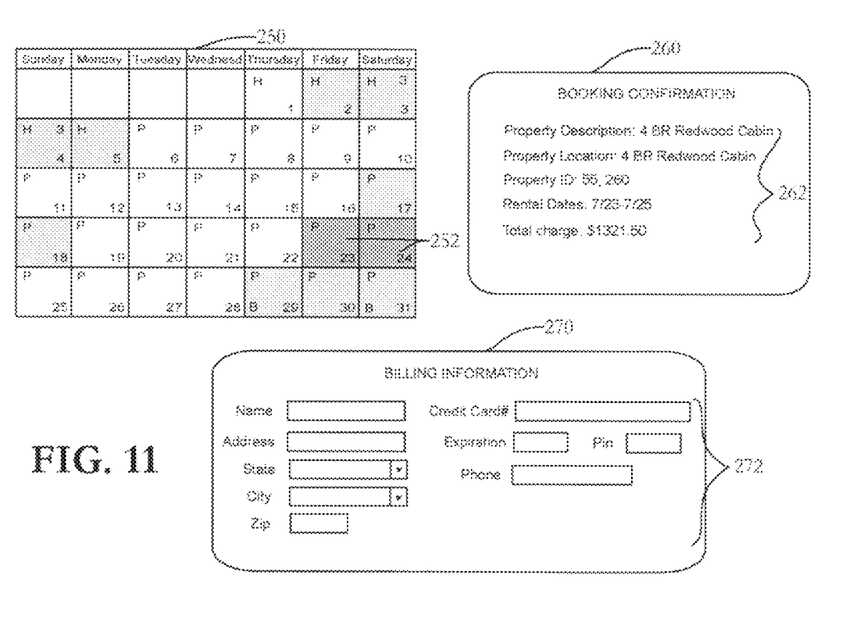
FIG. 11 is a screen view of an automated booking module in accordance with the present invention

When a renter decides on a property, they are prompted to enter the calendar dates for the time they wish to rent. As shown in FIG. 11, the user will be able to click on any date in the expanded availability calendar 250 that is available. This will be treated as their 'start date' (e.g. dark shaded area, e.g. blue, in July $23^{rd}$ for one of the two selected blocks 252). Once a date has been selected, the user will able to select and 'end date', also by clicking another box the availability calendar (e.g. dark shaded area for July $24^{th}$ for one of the two selected blocks 252). Entries from the main availability calendar 250 will be placed into separate entry points on the page.

Once the user has selected two dates, they will be able to hit "enter" or select the 'book now' (not shown) option. After selecting the desired rental period the calendar updates with blue background and black text to visually illustrate the prospective rental period. This only shows up to the current user, the data fields are held in a temporary bucket until receipt of payment is made. Once payment is made, the color is updated to red for the visual calendar 250 and is viewable by all users.

The user 30 may then be presented with a login page (not shown) if they are not already logged in. Options to register will also be available. Once a user has registered or logged in, they will be presented with a screen 260 showing an overview of data fields 262, e.g. the property selected (e.g. the property description, location, and property ID), the dates they wish to book (e.g. July 23-24), and also a summary of cost, based on the prices set by the owner 20 and assigned to the date fields 252. An algorithm automatically propagates this info based on previously entered fields from owner e.g. rental rate for each block on the calendar, and temporary calendar period selected by the user. Other fees, such as cleaning fee and charge that is calculated for tax specific to area of rental transient occupancy tax will be added to the total. This calculating step is also illustrated in calculating step 288 shown in method 280 of FIG. 12.

The user 30 may then be able to continue in the booking process. The billing information screen 270 having fields 272 may then be entered by the user. If the user has been previously registered, some or all of this information may auto-populate for view and approval by the user 30.

If the user 30 chooses to book, they may be presented with a rental agreement (not shown). The rental form with individual fields for renter/owner specific information automatically pre-populated with demographic information as supplied based on the stored fields for the user 30 and owner 20 in database 14 (e.g. demographic information as supplied from the user 30 when they registered their account. Terms and conditions for rental will also be presented on this document).

Once the rental agreement has been filled in a check box type system (not shown) will be in place that the user must check before submitting the form. This will ask the use to confirm they accept the terms and conditions laid out by the provided rental agreement, a copy will be stored in database 14 for later retrieval.

With the payment details entered and submitted in block 270, the card will be charged for the rental (partial or full), as illustrated in submission step 290 shown in method 280 of FIG. 12. The card charging process will be automated without any interaction by the user or owner.

Note that the owner 20 may have specified that he be prompted for authorization prior to affecting a charge. In this scenario, the communication module 90 interfaces with the third party entity 92 to pre-authorize the credit card and place the transaction on a "hold" while the system communication module 90 sends an email or text to the owner notifying them of the pending transaction. The owner can then reply to the message, via a "yes"-"no," designated pass code, or the like to approve the transaction. Once received, the communication module 90 commences charge of the card with the third party entity 92 to continue through the booking and billing process.

Credit card processing via third party transaction entity 92 will be done in real time via the communications module 90, at the point where the renter submits the final rental agreements. Since it will be done in real time, a transaction ID will be generated by the card processor 92, and transmitted back to the server. The authorization request sent by the communications module 90 may contain the property ID of the property, along with rental dates, so that when the authorization is received back from the card processor 92 (e.g. email or like communication) it contains the dates and property ID that is readable by the communications module 90. Once this transaction ID has been received, along with a success code, the communications module 90 will be able to link back the transaction ID to the rental that it is still currently processing, and record all details together in the database. It is also appreciated that software 16 may comprise a module to transact the credit purchase locally, and not through a third party. Furthermore, said transaction may be made through a private label entity.

After the card has been successfully charged, a 'receipt' (similar to the booking confirmation box 260, with user's name) may be displayed on screen. This will also be emailed to the renter, and owner.

In one embodiment, the property owner 20 may have specified for a deposit or partial or full payment to book a property for that date. Automated payment may be processed on-line through a third party entity 90 such as Paypal or like provider provider or through the site with monthly billing included with fee.

In another embodiment, all payments made through the website are done through authorize.net as the payment gateway. A site administrator may to set up the fees and handle the payments for bookings to the property owners outside the site. When a payment is made through the site (e.g. via server 12), the credit card information of the user 30 is taken (e.g. making sure all numbers except last 4 digits are * out) and not saving credit card information into database. Once the user submits the form for payment, e.g. via billing form 270, an API call will be made to third party entity 92 authorize.net/ payment gateway which will then authorize the credit card and if approved will capture the payment. The money will then be transferred into the administrator merchant account that the owner 20 has set up through authorize.net. If the card is not authorized, a message will be displayed on the site letting the user 30 know the reason the card was not accepted. This may be done through a SSL to ensure the site is secure. The security seal can then be displayed on the site provided by authorize.net.

When payment is accepted, notification is sent from the payment gateway of entity 92 back to the server 12, as illustrated in notification step 292 shown in method 280 of FIG. 12. The server 12 then starts an automated process according to the setting saved in the database 14 that were entered in from the property owner 20. The calendar 206/250 associated with the property is then updated by the system 10 to block off the dates requested by the user 30, as illustrated in updating step 294 shown in method 280 of FIG. 12. Subsequent users will then immediately see a calendar showing the dates blocked off in as shaded (red) color, and will not be able to select blocks 252 that are now shown as unavailable.

If the card is not charged successfully, a friendly error will be displayed, and allow them to provide alternate payment means (a different card). Calendar will remain blue for selected period.

After booking is created, one or more of e-mails may then generated by communication module 90 (according to settings provided of property owner 20 in data entry 80) and sent out to varies entities, as illustrated in notification step 296 shown in method 280 of FIG. 12. For example, a confirmation is sent to owner 20 and/or persons responsible, e.g. maid service or property manager to streamline dates that the occupancy will be in use and needs attention. The owner 20 can then login to the website, and view the transaction detail. The transaction detail can be viewed from a list of all transactions for this property. Transactions will be listed in date order by default. They will be able to at this time view the rental agreement to ensure everything has been correctly filled out. An email may also be sent with the owner's 20 instruction for the rental, which may be timed to be sent a specified period before the rental period is to occur.

If the owner 20 has a lease agreement uploaded, that may automatically be included in the email to the user 30. The property owner may also have the option of using the fillable lease form provided by the system 10.

The modules listed in FIG. 3 are illustrative of particular modules of interest in performing the system and methods of the present invention, but are not intended to be an exhaustive list of modules or functions performed. It is appreciated that a number of other functions routinely used in the art m, but are not intended to be an exhaustive list of modules or functions performed. It is appreciated that a number of other functions routinely used in the art may be implemented to operate the system and website of the present invention.

In one embodiment, a method of transacting a property rental in accordance with the present invention includes the steps of:

1) owner uploads description of property/pictures, and contact data to website.
2) owner sets calendar and pricing.
3) owner selects/modifies lease agreement.
4) software organizes uploaded data and displays on website for viewing
5) user views searchable set of owner listings.
6) user selects listing, views photos, calendar etc.
7) user selects dates on calendar, fills out lease form and renter info form, and makes payment.
8) system automatically sends renter info to owner, blocks off dates on calendar The unique features of the system of the present invention preferably include the following: an automated calendar is linked with auto pay billing system and the calendar is filled after booking has occurred and owner has confirmed by e-mail through company or owner. Customers can use a calendaring system to book rooms online. Administrators can set prices in back-end and indicate what level is needed dependant on season, length of stay etc. The users may pay for property and then check that they agree to lease terms. The user is charged for rental and an authorization fee is pre-authorized to take care of any damages. If any amount needs to be charged, administrator can do it and the rest will just be released after the property is checked. Each property may have its own calendar that is updated automatically and each customer can set their own pricing and low, med and high seasons. The owner can subscribe to place their properties into the system. The property owners can update pictures and property information through a secure Admin area. The subscription system will auto-bill their credit card until canceled. The System will auto-assign a property id number that they can use for their unique property URL like their own website. The user can subscribe to place their properties into the system. Property owners can update pictures and property information through a secure Admin area. The subscription system will auto-bill their credit card until canceled. The system may auto-assign a property id number that they can use for their unique property, e.g. URL-Myvho.vom/user/5467. Once a rental is booked the system sends an email notification to the cleaner and Property Management so that property can be ready for guest's arrival. Administrator will be able to set the price for membership. Charge will be to property owner when they sign up. Fees—Tax rates can be automatically included for each property, Cleaning rates—flat rate, Weekly, Daily fees, etc. The system may have a browse feature that will help returning customer find rental property by Number feature. Website may also be used to search properties in areas that renters are interested in: example Lake Tahoe CA or Tamarindo Costa Rica, and come up with listing of properties that our currently linked to website. The website may have search engine capabilities for worldwide properties for and destinations.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for automatic updating of a rental property listing, comprising:
    a server comprising a processor;
    a database coupled to the server and configured to store one or more data fields relating to a plurality of individual rental property listings each corresponding to a rental property owned by separate property owners;
    software executable on said server processor for:
        providing a graphical user interface for each of the individual rental property listings, each graphical user interface containing data populated from a plurality of data fields in said database;
        wherein the plurality of data fields comprise rental rate values corresponding to calendar dates;
        wherein the graphical user interface comprises a calendar relating individually to each individual rental property listing and represented by a plurality of visual entities, each of said visual entities corresponding to a date on said calendar;
        associating each of the calendar dates with an individual rental rate value such that a first calendar date is associated with a different rental rate than a second calendar date;
        allowing user selection of one or more calendar dates for booking;
        automatically calculating a total billing charge based on the selected one or more calendar dates;
        automatically receiving notification regarding a payment received with respect to said total billing charge for booking the selected one or more calendar dates, each relating to at least one of said visual entities;
        automatically updating a characteristic of said at least one visual entity based on said notification;
        wherein said characteristic indicates that the property listing is unavailable for future booking on a date related to said visual entity;
        the graphical user interface comprising one or more data entry fields within a property owner webpage interface for a property owner to upload data relating to an individual rental property listing;
        wherein the server is coupled to a network such that a plurality of users may view said individual property listings from a user webpage interface;
        allowing an individual property owner to input data in the one or more data entry fields for assigning each of the calendar dates with individual rental rate values and a minimum rental period value;
        upon input of said data from the property owner, automatically updating one or more data fields in the database, the one or more updated data fields relating to said calendar to associate calendar dates within the calendar with the input individual rental rate values and minimum rental period value:,
        in response to user selection of a plurality of calendar dates from the user webpage interface, automatically comparing the selected calendar dates against the inputted minimum rental period value and allocating the inputted individual rental rate value assigned to each of the selected calendar dates for inclusion in the total billing charge;
        wherein booking is automatically blocked upon user selection of one or more calendar dates having a booking value falling short of a minimum rental period value corresponding to at least three consecutive calendar dates; and
        wherein booking is automatically allowed upon user selection of calendar dates meeting a minimum rental period value corresponding to at least three consecutive calendar dates.

2. A system as recited in claim 1, wherein upon user selection of the one or more calendar dates for booking, the software is further configured for:
    securing payment from said user with respect to said one or more selected calendar dates;
    receiving notification with respect to confirmation of said payment; and
    correlating said notification to the selected property listing calendar for updating a characteristic of said at least one visual entities;
    wherein securing payment from said user comprises:
        sending payment data to a payment gateway;
        requesting approval for said payment data; and
    wherein receiving notification comprises receiving a notification of confirmation of said payment from said payment gateway.

3. A system as recited in claim 1, wherein said input data from the property owner is visually represented on at least one of said plurality of visual entities.

4. A system as recited in claim 1, wherein allowing user selection of one or more calendar dates for booking comprises:
    allowing user selection of first and second visual entities on said calendar for booking first and second calendar dates having different associated rental rate values; and automatically calculating a total billing charge based on the selected first and second visual entities.

5. A system as recited in claim 1, further comprising:
automatically sending an email to the user based on said notification;
said email comprising a lease agreement related to said listing.

6. A system for automatic updating of a rental property listing, comprising:
a server comprising a processor;
a database coupled to the server and configured to store one or more data fields relating to a plurality of individual rental property listings each corresponding to a rental property owned by a property owner;
software executable on said server processor for:
providing a graphical user interface for each of the individual rental property listings, each graphical user interface containing data populated from a plurality of data fields in said database;
wherein the graphical user interface comprises a calendar relating individually to each individual rental property listing and represented by a plurality of visual entities, each of said visual entities corresponding to a date on said calendar;
wherein the plurality of data fields comprises one or more minimum rental period values and rental rate values corresponding to calendar dates; and
associating each of the calendar dates with an individual rental rate value such that a first calendar date is associated with a different rental rate than a second calendar date;
associating a minimum rental period value with a booking value of at least three consecutive calendar dates;
the graphical user interface comprising one or more data entry fields within a property owner webpage interface for a property owner to upload data relating to an individual rental property listing;
wherein the server is coupled to a network such that a plurality of users may view the individual property listings from a user webpage interface;
allowing a property owner to input data in the one or more data entry fields for assigning each of the calendar dates with individual rental rate values and a minimum rental period value;
upon input of said data from the property owner, automatically updating one or more data fields in the database, the one or more updated data fields relating to said calendar to associate calendar dates within the calendar with the input individual rental rate values and minimum rental period value;
in response to user selection of a plurality of calendar dates from the user webpage interface, automatically comparing the selected calendar dates against the inputted minimum rental period value and allocating the inputted individual rental rate value assigned to each of the selected calendar dates for inclusion in the total billing charge;
wherein booking is blocked upon user selection of one or more calendar dates having a booking value falling short of a minimum rental period value corresponding to at least three consecutive calendar dates;
wherein booking is allowed upon user selection of calendar dates meeting a minimum rental period value corresponding to at least three consecutive calendar dates.

7. A system as recited in claim 6, wherein upon user selection of the one or more calendar dates for booking, the software is further configured for:
securing payment from said user with respect to said one or more selected calendar dates;
receiving notification with respect to confirmation of said payment; and
correlating said notification to the selected property listing calendar for updating a characteristic of said at least one visual entity;
automatically updating a characteristic of said at least one visual entity based on said notification;
wherein said characteristic indicates that the property listing is unavailable for future booking on a date related to said visual entity.

8. A system as recited in claim 6, further comprising:
providing data entry fields for an individual property owner to upload data relating to said individual rental property listing; and
correlating said uploaded data to said one or more visual entities.

9. A system as recited in claim 8, wherein securing payment from said user comprises:
sending payment data to a payment gateway;
requesting approval for said payment data; and
wherein receiving notification comprises receiving a notification of confirmation of said payment from said payment gateway.

10. A system as recited in claim 8, wherein said input data from the property owner is visually represented on at least one of said plurality of visual entities.

11. A system as recited in claim 10, wherein allowing user selection of one or more calendar dates for booking comprises;
allowing user selection of first and second visual entities on said calendar for booking first and second calendar dates having different associated rental rate values; and
automatically calculating a total billing charge based on the selected first and second visual entities.

12. A system for automated management of a rental property listing, comprising:
a server comprising a processor;
a database coupled to the server and configured to store a plurality of data fields relating to a plurality of individual rental property listings each corresponding to a rental property owned by separate property owners;
software executable on said server processor for:
providing a graphical user interface for each of the individual rental property listings;
each graphical user interface containing data populated from a plurality of data fields in said database;
wherein each graphical user interface comprises a calendar relating individually to each individual rental property listing;
the calendar visually represented by a plurality of visual entities, each of said visual entities corresponding to a date on said calendar;
the graphical user interface comprising data entry fields within a property owner webpage interface for a property owner to upload data relating to an individual rental property listing;
wherein said data comprises a rental rate values corresponding to dates on said calendar;
wherein the server is coupled to a network such that a plurality of users may view said individual property listings from a user webpage interface;
allowing a property owner to input data in the data entry fields for assigning each of the calendar dates with individual rental rate values such that a first calendar date is associated with a different rental rate than a second calendar date and a minimum rental period value that is associated with a booking value;

upon input of said data from the property owner, automatically updating one or more data fields in the database, the one or more updated data fields relating to said calendar to associate calendar dates within the calendar with the input individual rental rate values and minimum rental period value;

in response to user selection of one or more calendar dates for booking from the user webpage interface, automatically comparing the selected calendar dates against the inputted minimum rental period value and allocating the inputted individual rental rate value assigned to each of the selected calendar dates for inclusion in the total billing charge;

wherein booking is automatically blocked upon user selection of one or more calendar dates having a booking value falling short of a minimum rental period value corresponding to at least three consecutive calendar dates;

wherein booking is automatically allowed upon user selection of calendar dates meeting a minimum rental period value corresponding to at least three consecutive calendar dates;

and displaying the total billing charge to the user.

13. A system as recited in claim 12, wherein upon user selection of the one or more calendar dates for booking, the software is further configured for:

securing payment from said user with respect to said one or more selected calendar dates;

receiving notification with respect to confirmation of said payment; and correlating said notification to the selected property listing calendar for updating a characteristic of said at least one visual entity;

automatically updating a characteristic of said at least one visual entity based on said notification;

wherein said characteristic indicates that the property listing is unavailable for future booking on a date related to said visual entity.

14. A system as recited in claim 12, wherein allowing user selection of one or more calendar dates for booking comprises;

allowing user selection of first and second visual entities on said calendar for booking first and second calendar dates having different associated rental rate values; and automatically calculating a total billing charge based on the selected first and second visual entities.

15. A system as recited in claim 12:

wherein the software further comprises a search query module configured to allow users to search the database for property listings;

wherein the search query module is configured to allow the user to search for property listings within a specified date range and price range;

wherein the specified date range comprises three consecutive calendar dates;

wherein the search query module only returns property listings having available calendar dates within the specified date range that all have associated rental rate values within the specified price range.

* * * * *